(12) United States Patent
Bultmeyer et al.

(10) Patent No.: US 7,792,693 B2
(45) Date of Patent: Sep. 7, 2010

(54) DISTRIBUTED WORKFLOW TECHNIQUES

(75) Inventors: Jonathan Paul Bultmeyer, Dorchester, MA (US); Stephen R. Carter, Spanish Fork, UT (US); Howard Melman, Newton, MA (US); Bjarne Rasmussen, Concord, MA (US); Kasman Ellis Thomas, Wilton, CT (US)

(73) Assignee: Novell, Inc., Provo, UT (US)

( * ) Notice: Subject to any disclaimer, the term of this patent is extended or adjusted under 35 U.S.C. 154(b) by 1149 days.

(21) Appl. No.: 11/065,897

(22) Filed: Feb. 25, 2005

(65) Prior Publication Data

US 2006/0195347 A1 Aug. 31, 2006

(51) Int. Cl.
*G06F 17/60* (2006.01)
(52) U.S. Cl. ........................................................ 705/8
(58) Field of Classification Search ................. 705/8, 705/10
See application file for complete search history.

(56) References Cited

U.S. PATENT DOCUMENTS

| | | | |
|---|---|---|---|
| 5,710,578 A * | 1/1998 | Beauregard et al. ......... 345/441 |
| 5,754,857 A | 5/1998 | Gadol | |
| 5,826,239 A | 10/1998 | Du et al. | |
| 5,870,545 A * | 2/1999 | Davis et al. ................. 709/201 |
| 5,937,388 A * | 8/1999 | Davis et al. ..................... 705/8 |
| 5,960,404 A | 9/1999 | Chaar et al. | |
| 6,041,306 A * | 3/2000 | Du et al. ......................... 705/8 |
| 6,088,679 A | 7/2000 | Barkley | |
| 6,151,583 A | 11/2000 | Ohmura et al. | |
| 6,401,073 B1 * | 6/2002 | Tokuda et al. .................... 705/8 |
| 6,424,948 B1 | 7/2002 | Dong et al. | |
| 6,539,404 B1 | 3/2003 | Ouchi | |
| 6,606,642 B2 | 8/2003 | Ambler et al. | |
| 6,707,903 B2 | 3/2004 | Burok et al. | |
| 6,728,947 B1 | 4/2004 | Bengston | |
| 6,772,407 B1 | 8/2004 | Leymann et al. | |
| 7,155,720 B2 * | 12/2006 | Casati et al. ................. 718/104 |
| 7,386,577 B2 * | 6/2008 | Arning et al. ................ 707/201 |
| 7,398,525 B2 * | 7/2008 | Leymann et al. ............. 718/104 |
| 7,499,906 B2 * | 3/2009 | Kloppmann et al. ........... 707/1 |
| 2002/0013723 A1 * | 1/2002 | Mise ............................... 705/8 |
| 2002/0170035 A1 * | 11/2002 | Casati et al. ................. 717/127 |
| 2003/0065550 A1 * | 4/2003 | Hoffman et al. ............... 705/10 |
| 2003/0135384 A1 * | 7/2003 | Nguyen ........................... 705/1 |
| 2004/0162741 A1 * | 8/2004 | Flaxer et al. ..................... 705/7 |
| 2006/0021019 A1 * | 1/2006 | Hinton et al. ................. 726/10 |

OTHER PUBLICATIONS

Oinn "Delivering web service coordination capability to users", May 2004, International World Wide Web Conference archive Proceedings of the 13th international World Wide Web conference on Alternate track papers & posters table of contents, pp. 1-2.*

(Continued)

*Primary Examiner*—Romain Jeanty
(74) *Attorney, Agent, or Firm*—Schwegman, Lundberg & Woessner, P.A.

(57) ABSTRACT

Techniques for distributed workflow processing are presented. A first workflow system and a second workflow system process actions of a workflow. The workflow is coordinated through one or more identity services. The identity services also establish trusted and secure communications between the first and second workflow systems.

13 Claims, 3 Drawing Sheets

OTHER PUBLICATIONS

Montzas "Modelling business processes with workflow systems: an evaluation of alternative approaches", Apr. 2001, Department of Electrical and Computer Engineering, National Technical University of Athens, pp. 1-13.*

Dellen et al "Knowledge-based techniques to increase the flexibility of workflow management", Sep. 1997, Data & Knowledge Engineering, vol. 23, Issue 3, pp. 269-295.*

European Application No. 06110238 Office Action dated Nov. 29, 2007, 16 pgs.

Chiu, Dickson, et al., "A Logical Framework for Exception Handling in ADOME Workflow Management System", *Department of Computer Science, University of Science and Technology*, Clear Water Bay, Kowloon, Hong Kong, (2000), 110-125.

Chiu, Dickson K., et al., "Poster on "Exception Handling in ADOME Workflow Management System"", *Hohg Kong University of Science& Technology*, (1997), p. 227.

Hagen, Claus, et al., "Exception Handling in Workflow Management Systems", *IEEE Transactions on Software Engineering*, vol. 26 No. 10, (Oct. 2000), 948-958.

Kittel, S.Li A., et al., "Security Considerations for Workflow Systems", *GTE Information Technology*, (2000), 665-668.

Klingemann, Justus, et al., "Adaptive Outsourcing in Cross-Organizational Workflows", *GMD- Forschungszentrum Informationstechnik GmbH Schlob Birlinghoven* D-53754 Sankt Augustin Cermany, (1999),1-24.

Kwak, Myungjae, et al., "A Framework for Dynamic Workflow Interoperation Using Multi-Subprocess Task", *Electronics and Telecommunications Research Institute* 161 Gajeong,Yusong, Taejon, 305-350, South Korea, (2002),8 pgs.

Kwak, Myungjae, et al., "A Framework Supporting Dynamic Workflow Interoperation and Enterprise Application Integration", *Electronics and Telecommunications Research Institute* 161 Gajeong,Yusong, Taejon, 305-350, South Korea, (2002), 10 pgs.

Ludwig, Heiko, et al., "Virtual Enterprise Co-ordinator-Agreement—Driven Gateways for Cross-Organisational Workflow Management", *IBM Research Division, Zurich Recearch Laboratory* 8803 Ruschlikon, Switzerland, (1999),29-38.

Song, Yoonki, et al., "Exception Specification and Handling in Workflow Systems", *Information and Communications University*, 58-4 Hwaam-Dong, Yuseong-Gu, Daejeon, 305-732, Korea, (2003),943-58.

"European Search Report for Application No. EP 06 11 0238", 14 Pages.

"Terminology & Glossary", *The Workflow Management Coalition Specification*, Doc. No. WFMC-TC-1011, Issue 3.0, (Feb. 1999), 1-65.

"Workflow Security Considerations—White Paper", *The Workflow Management Coalition Specification*, Doc. No. WFMC-TC-1019, Issue 1.0, (Feb. 1998), 1-15.

"Workflow Standard—Interoperability Abstract Specification", *The Workflow Management Coalition Specification*, Doc. No. WFMC-TC-1012, (Nov. 30, 1999), 1-40.

Au, Richard, et al., "Automated Cross-organisational Trust Establishment on Extranets", *Information Technology for Virtual Enterprises*, (Jan. 29, 2001), 3-11.

Hollingsworth, D., "Workflow Management Coalition, The Workflow Reference Model", Document No. TC00-1003, (Jan. 19, 1995), 1-55.

Kaijser, Per, et al., "Sesame: The solution to security for open distributed systems", *III: Security Applications, Butterworth-Heinemann Ltd. computer communications*, vol. 17, No. 7, (Jul. 1994), 501-518.

Lopez, J., et al., "Authentication and authorization infrastructures (AAI's): a comparative survey", *Computers & Security*, vol. 23, No. 7, (Oct. 2004), 578-590.

Neuman, Clifford, et al., "Kerberos: An Authentication Service for Computer Networks", *IEEE Communication Magazine 32*, No. 9, (Sep. 1994), 6 Pages.

Schulz, Karsten A., et al., "Facilitating cross-organisational workflows with a workflow view approach", *Data & Knowledge Engineering*, vol. 51, No. 1, (2004), 109-147.

"Bolero's Trusted Trade Platform", *Bolero.net: Solutions: Bolero's Trusted Trade Platform*, http://www.bolero.net/solutions/trade_platform/ , (site visited Jan. 24, 2005),pp. 1-4.

"Process Manager", *NexPrise: Powering Your Knowledge Base*, http://www.nexprise.com/products/procAuto_index.jsp, (site visited Jan. 24, 2005),pp. 1-2.

"Singularity's Workflow Solution", *Business Process Management & Workflow Solutions*, http://www.profit-thru-process.com/landing/google_workflow.asp, (site visited Jan. 24, 2005),pp. 1-3.

* cited by examiner

DISTRIBUTED WORKFLOW TECHNIQUES

FIELD

The invention relates generally to workflow processing and more particularly to distributed workflow coordination, security, and processing.

BACKGROUND

Workflow Management Systems (WFMS) are popular services implemented by businesses to automate processes. WFMS are generally used to automate manual processes. In some cases, WFMS have evolved into computerized and complex mechanisms that allow businesses to substantially streamline procedures or activities. The Workflow Management Coalition (WfMC) defines workflow as: "the automation of a business process, in whole or part, during which documents, information, or tasks are passed from one participant to another for action, according to a set of procedural rules."

Conventional WFMS lack true interoperability. That is, a particular workflow system does not generally communicate or integrate well with other disparate workflow systems or other external services. Moreover, even if a robust workflow system is found it is usually proprietary and limited to a single enterprise and the systems and services available within that enterprise. WFMS which are considered partially interoperable are typically built on top of conventional electronic mail (email) systems and lack sophisticated control-flow and handling constructs of standard WFMS such as splits, joins, merges, waits, branches, etc.

Additionally, WFMS commonly gather information which indicates that a business decision has been made. Some of these decisions can be highly sensitive (e.g., salary related, purchase related, etc.) and may have the potential to dramatically impact the business if the privacy and secrecy of the decisions are not maintained in confidence within the business. Because of this, WFMS are often controlled via a centralized system where tight access controls and security can be monitored, managed, and enforced. But, the centralized approach also tends to dramatically decrease the WFMS interoperability and accessibility which makes the centralized approach less useful to a business that has a geographically dispersed and mobile workforce.

Therefore, improved distributed workflow techniques are desirable.

SUMMARY

In various embodiments, distributed workflow processing techniques are presented. In an embodiment, an action is identified within a workflow, where the action is associated with a service of an external environment. The action or the workflow is communicated to the external environment where the action or workflow is authenticated via interactions with an identity service. If authenticated, the action is processed within the external environment by the service.

DETAILED DESCRIPTION

Figure 1:
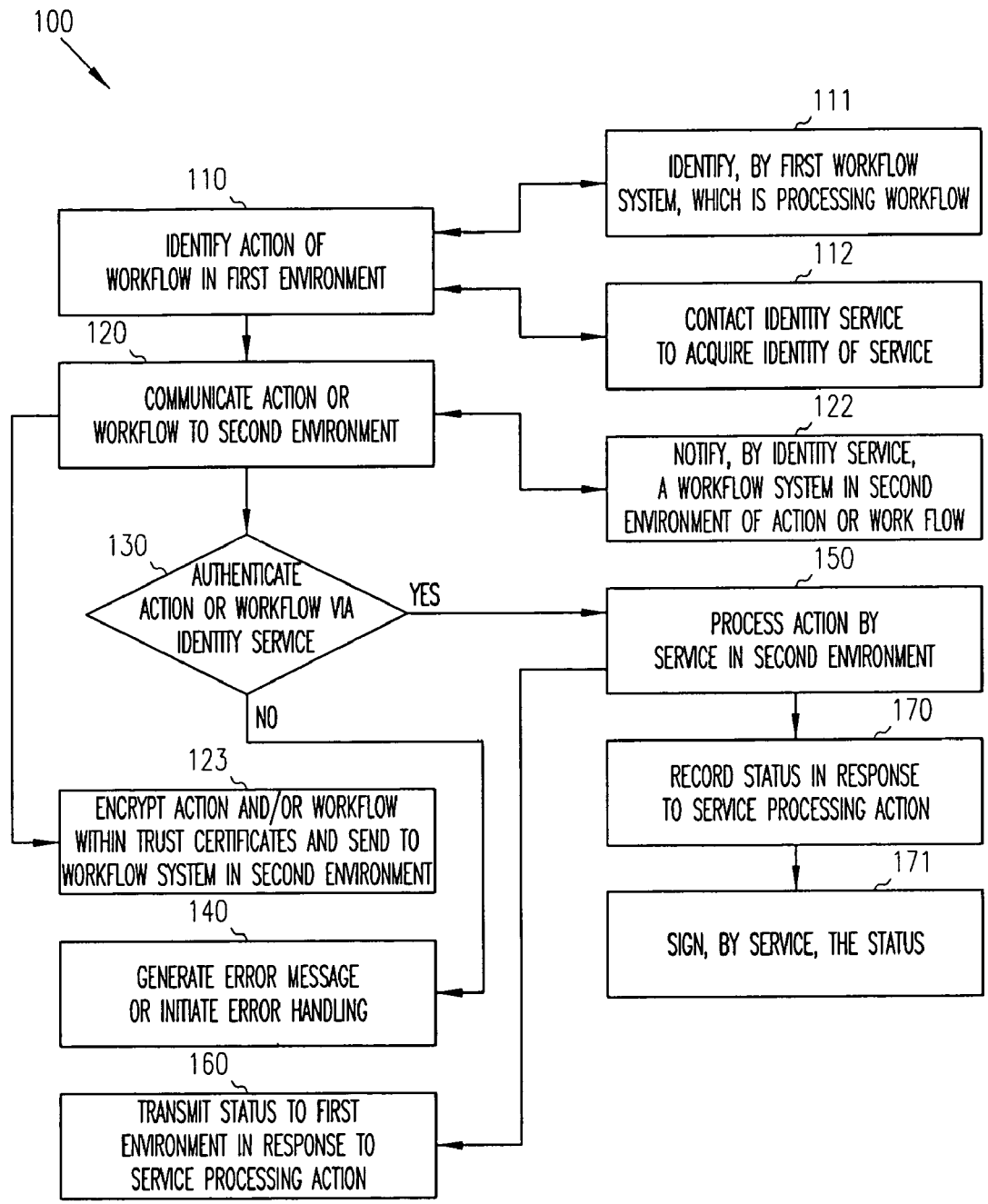
FIG. 1 is a diagram of a method for processing a workflow, according to an example embodiment.

As used herein participants of transactions engage in interactions with one another via trusted relationships. A special network participant is referred to as an "identity service." The identity service has a trusted relationship with the other participants of the network and provides a novel mechanism for the other participants to become dynamically trusted with one another through the identity service. Examples of identity services having dynamic trust establishment techniques can be found in U.S. Ser. No. 10/765,523 entitled "Techniques for Dynamically Establishing and Managing Authentication and Trust Relationships;" U.S. Ser. No. 10/767,884 entitled "Techniques for Establishing and Managing a Distributed Credential Store;" and U.S. Ser. No. 10/770,677 entitled "Techniques for Dynamically Establishing and Managing Trust Relationships;" the disclosures of which are incorporated by reference herein.

A "trust specification" is a data structure managed by the identity service. The trust specification defines relationships, access rights, privileges, authentication mechanisms, and policies for participants vis-à-vis other participants. Trust specifications may be hierarchical meaning that some trust specifications are parents to other trust specifications. In other words, some trust specifications may be globally applied. Thus, a trust specification may be associated with groups of participants or with a single participant. The trust specification does not have to be stored in the identity service although it can be; in some cases it is stored in a credential store.

A participant may be a user, a system, a service, a resource, a workflow, or logical groupings of any combination of these. Moreover, as used herein the terms service, system, and resource may be used interchangeably and synonymously. In some embodiments, the identity service and the principal can communicate with one another via Security Assertion Markup Language (SAML) or via Liberty assertions and their associated protocols. The trust specification also ensures that communications are secure and verifiable in order to maintain proper security. Thus, information passed between the participants and the identity store may be encrypted and associated with digital signatures and/or certificates. Proper keys are obtained via the identity store and distributed only to authenticated participants having the proper authority and access rights defined in a trust specification.

A workflow may be any data structure produced by a workflow system. A workflow includes actions, specifications, directives, references to services to perform actions, and the like. Any existing workflow data structure associated with a specific workflow system or formatted according to a consortium-based alliance in a generic manner is intended to fall within the embodiments presented herein. In some embodiments, workflows are given their own unique identity and are managed as participants. This will be discussed more fully herein and below.

The phrase "external environment" is intended to be a relative term; meaning that an environment is external when viewed from a particular participant's local environment. An external environment is one that is accessed over a network. The network may be wired, wireless, or a combination of wired and wireless. Furthermore, two workflow systems are disparate to one another when they are not the same instances of the same system. Thus, different products are disparate from one another and different versions of the same system may also be viewed as being disparate from one another.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, workflow systems, identity services, or browser/client applications. Any particular architectural layout or implementation presented herein is provided for purposes of illustration and comprehension only and is not intended to limit aspects of the invention.

FIG. 1 is a diagram of a method 100 for processing a workflow, according to an example embodiment. The method 100 (hereinafter "workflow agent service") is implemented in a machine-accessible and readable medium and is operational over a network. The network may be wired, wireless, or a combination of wired and wireless.

The workflow agent service may interact with a centralized identity service or its own independent identity service. In an embodiment, the workflow agent service is part of a modified workflow system. Alternatively, the workflow agent service is layered on top of an unmodified and existing workflow system. Optionally, the workflow agent service may also directly interact with one or more other agent services associated with external and disparate workflow systems.

Initially, the workflow agent service is managing a workflow within a first environment within which the workflow agent service is processing. As actions or tasks of the workflow are completed, the workflow agent service evaluates next actions of the workflow. At some point in processing, the workflow agent service, at 110, identifies an action within the workflow that is associated with a service of an external or second environment.

In an embodiment, at 111, the action may be identified by a first workflow system which is processing the workflow and in communication directly or indirectly with the workflow agent service. For example, the workflow agent service may monitor a workflow system and detect that it encountered an unknown action. At this point the workflow agent service picks up the processing on behalf of the workflow system. Thus, techniques such as these may be used to avoid modifying existing workflow systems and still permitting these existing workflow systems to benefit from the teachings presented herein.

Identification may occur in a variety of manners. For example, the action embedded within the workflow may be in a format or associated with a name that is unknown to the workflow agent service. In this example, the fact that the workflow agent service cannot resolve the action triggers the workflow agent service to perform a query to a location service or to its identity store. This can result in an identity reference being returned to the workflow agent service that identifies the service which can perform the action.

As another example, the action may include an identity reference to the service that is associated with the action. At 112, the identity reference may be used to contact the identity store. The identity store inspects the trust specification for the workflow in question and returns a specific identity reference and location for the service that will process the identified action.

In yet other situations, the action itself defined within the workflow may identify the logical address of the service that can perform the action. In other words, the action includes the full network address to contact the service.

Once the workflow agent service has identified a foreign action within the workflow and the appropriate service or resource to assist in processing that action, at 120, the workflow agent service communicates the action, a portion of the workflow, or the workflow having the action to a second environment associated with the service. Again communication can occur in a variety of direct and indirect manners.

For example, the workflow agent service may directly send a message or externally invoke the desired service and provide the action. In another embodiment, the workflow agent service generates a sub workflow that identifies actions for an external or second workflow system or second agent service to perform in addition to the desired action, such as record status in a specific location once processing has been completed by the service. In yet other embodiments, the workflow agent service transmits the entire workflow to an external workflow system or agent of a second workflow system along with an activity log or other indication as to the next action which is to be performed.

In an embodiment, at 122, the communication may also be achieved via the identity service. That is, in some instances, the identity service may be adapted to contact an agent or second workflow system and provide the workflow or sub workflow having the action that requires processing.

In still other embodiments, at 123, the action, sub workflow, or entire workflow may be encrypted within a certificate and transmitted via the workflow agent service to a second workflow system, an agent of the second workflow system, or the desired service. Once the recipient receives that certificate, the recipient contacts the same or its own identity service for purposes of verifying the statements encrypted within the certificate. Thus, in some embodiments, the workflow agent service may simply create a certificate having the identity of the workflow and transmit this certificate to the recipient for processing.

Accordingly, at 130, the communicated action or workflow is authenticated via the same identity service of the workflow agent service or via a different identity service separately accessible to the recipient. The recipient resides in the second environment, and if different identity services are used, then the two different identity services are adapted to communicate with one another for purposes of authenticating the workflow agent service, the workflow, and the recipient, within the second environment, with one another and creating a dynamic trust relationship with respect to one another. To do this, the recipient of the action or workflow contacts its identity service and asks if the workflow and/or the sending workflow agent service are legitimate and whether processing of the workflow or action is permissible according to the trust specification. If authentication cannot be established, then the action is not processed and, at 140, error messages may be generated or error processing initiated.

However, at 150, if the recipient is able to authenticate the workflow or action, then, the recipient contacts the service within the second environment to process the desired action. It should be noted that the service may itself be a recipient and may contact its own identity service for purposes of validating that it can perform the action being requested of it. This procedure can be nested, such that if the service uses a sub service to perform the action, that sub service may independently satisfy itself as to the legitimacy of the participants and the action requested.

In an embodiment, at 160, the result of the processed action may be noted via status and that status may be transmitted back to the first environment or workflow agent service. By maintaining a log or status for the actions and activities being performed with respect to the workflow, coordination can be achieved. In other words, the log can be used to achieve the synchronization. A participant inspects the log to determine what action is next in line to be processed. The log may also include information useful to processing an action (e.g., processing parameters, file or data references, etc.). Log entries may be signed or contained in SAML assertions, which an identity service or other trusted participants may use to authenticate.

In another embodiment, status associated with processing the action is transmitted independent of any particular log directly to participants via a messaging service. For example, the service or an agent associated with the second environment and the second workflow system may instant message (IM) or email a status to the workflow agent service. The IM may be initiated automatically by the service or agent from within the second environment. Alternatively, the IM may occur after the workflow agent service queries the agent or service about the status. Thus, status can be pushed or pulled from the second environment.

In yet another embodiment, at 170, status associated with processing the action may be recorded within metadata of the workflow data structure itself. This permits any participant that receives the workflow for processing to identify rapidly what has happened with the workflow and what still has to occur with the workflow.

The metadata may be linked by a pointer or reference to the workflow or may physically reside within the data of the workflow. In cases where the workflow uses a proprietary format, the status may still be carried by using comment syntax within the proprietary format. The comments may be recognized and processed by selective participants, such as the workflow agent service. In this way, the status may still be centralized and carried with the workflow even when the workflow is being processed by a plurality of distributed and disparate workflow systems.

In an embodiment, at 171, the status may be digitally signed by the participants that generate it. This can serve to satisfy subsequent participants or audit services that the workflow has not been tampered with and that a legitimate and reliable audit trail is reproducible. This serves as a non-repudiation mechanism for capturing participants' interactions with the workflow in such a way that the fact of the participation and the natures of the participants' contributions cannot be refuted.

In summary, the status or log information associated with participants that process the workflow may be captured in a centralized data store, directory, or electronic file. Alternatively, the status or log information may be independent of any particular log and may be communicated via a messaging service. Additionally, the status or log information may be stored in a plurality of distributed and discreet logs and communicated as needed via query interactions from one environment to another environment. Still further, the status or log information may be carried as metadata that is physically carried in the workflow or logically linked to the workflow.

It has now been demonstrated how a distributed workflow may be processed in a secure and trusted manner through interactions with one or more identity service. To further illustrate some of these features an example scenario is presented below. The example is for purposes of illustration only and is not intended to limit the teachings presented herein.

Initially, a workflow is created for a business process. The workflow identifies a number of services or resources and actions used within the business process. The workflow is given an identifier as a participant and registered with an identity service. A trust specification associated with the workflow identifies the participants that can access and act on certain aspects of the workflow. The trust specification is accessible to the identity service via the identifier associated with the workflow. The identity service may interact with a plurality of other identity services in different environments.

When an agent initiates the workflow, the agent authenticates itself to its identity service and requests the workflow or requests access to the workflow. The identity service accesses the trust specification to ensure access is appropriate and supplies the certificates necessary for the agent to access the workflow or interact with the workflow for purposes of acquiring its information. The agent then starts the workflow according to the directives of the workflow within the agent's environment.

At each stop, branch, split, join, etc. within the workflow directives, participants verify that the workflow is authentic, has not been tampered with, and is secure via interactions with their identity services. Information is extracted to perform actions from the workflow via certificates which are distributed and managed by the identity services and/or participants.

If a workflow stop involves a business decision or action that requires audit tracking or verification, the participant performing the action at that stop uses an appropriate identity service and trust certificate to create a digital signature which is included in the metadata of the workflow or which is separately stored in an audit log (the audit log may reside in a credential store).

Moreover, if a split or branch occurs to a foreign or external environment during the processing of the workflow, then the workflow agent service uses the workflow definition to determine what portion of the workflow (whole or part) is to accompany the branch and what trust certificates may be required during the branch by a participant to process the actions being requested during the branch. The workflow statements themselves may be embedded within the trust certificates.

When the workflow traverses a business or environmental boundary, the trust certificates may or may not be directly usable by the new external domain. If the trust certificates are not directly usable then a number of techniques may be used to ensure processing continues unabated. First, at least one of the trust certificates is usable. The workflow specification itself may have required this and it may be used to simply identify the workflow to the external environment. This usable trust certificate may be used to contact the external environment's identity service and verify the workflow. The identity service interacts with one or more other identity services and acquires usable trust certificates for the participant in the external environment. If a participant in the external environment is a first participant, then new trust certificates that are unique to the environment may be generated via the identity service using the participant's credentials. The new trusted environment may use existing trust certificates without performing validation based on its security specifications.

At each processing step of the workflow, the workflow specification may require an auditable log to be generated. These log entries may be signed by each participant's credentials, credentials included within one or more of the trust certificates, or by the credentials owned by the environment in which a stop occurs (e.g., if the stop is automated, the automated agent will have an identity and trust certificate).

The processing of the workflow continues until the workflow is completed. At this point, the final workflow tasks are competed according to the workflow specification and any information attached to the workflow is validated against the owner(s) of the trust certificates that were used to sign the information. If valid, that information is injected into the business as appropriate.

Techniques for processing a workflow in a distributed, decoupled, and secure manner have now been presented. A trust specification cooperates with one or more identity services to coordinate between disparate workflow systems and environments. In some embodiments, actions are performed by participants having valid trust certificates. These trust certificates may be coordinated between the participants to one another or distributed via the identity services. In some cases, participants may also delegate trust to other participants providing that the trust specification of the workflow permits such an arrangement.

It should also be noted that although the techniques presented herein have been discussed in terms of a workflow system, the techniques are equally applicable to interactions that are workflow like, such as Service Oriented Architecture (SOA) modules that pass a transaction along several processing stops with the path being determined at execution time.

Figure 2:
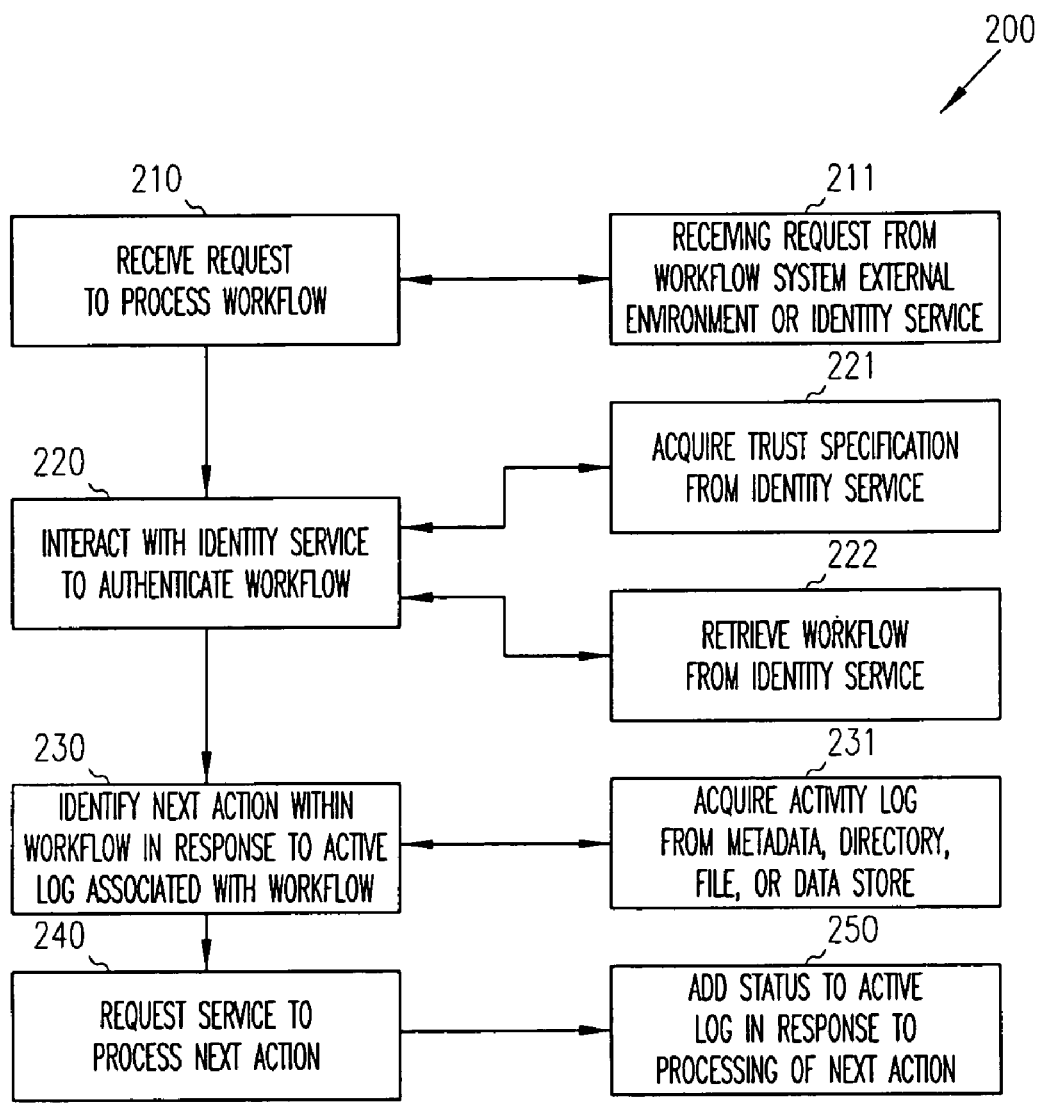
FIG. 2 is a diagram of another method for processing a workflow, according to an example embodiment.

FIG. 2 is a diagram of another method 200 for processing a workflow, according to an example embodiment. The method 200 (hereinafter "agent service") is implemented in a machine-accessible and readable medium and is operational over a network. The network may be wired, wireless, or a combination of wired and wireless. The agent service of FIG. 2 provides an alternative view to the processing of the workflow agent service represented by the method 100 of FIG. 1.

Initially, participants are processing or available to be processed in a variety of environments. Some of these environments are external to other ones of the environments. The participants and the environments are capable of establishing dynamic trust with one another via one or more identity services. Examples of identity services and interactions for achieving dynamic trust were presented above and incorporated by reference above.

A unique participant is a workflow which is processed and consumed by other ones of the participants. The workflow includes a trust specification that identifies the rights, privileges, and other participants who may interact and consume the directives of the workflow. In an embodiment, the workflow or portions of the workflow are delivered to and passed between participants and identity services as encrypted trust certificates. Thus, the information included within the workflow is only consumed by trusted participants that have the proper keys to decrypt and validate the trust certificates.

At 210, the agent service receives a request to process a workflow. The request may originate from a variety of sources. For example, at 211, the request may be received from a workflow system associated with an external or foreign environment or the request may be received from an identity service that communicates with the agent service. In other cases, the request may be manually initiated from a user interfaced to the workflow system.

The request may include a statement or action from the workflow, a subset of the workflow, a whole workflow, or an identity for the workflow. Moreover, the request may be represented as a trust certificate, such that the agent service is only capable of viewing the information within the request after successfully validating and decrypting the trust certificate. The source of the request also includes an identity; the source identity may be used by the agent service to acquire the appropriate authorization and keys for consuming the trust certificate.

At 220, the agent service interacts with an identity service to authenticate the workflow or the request (e.g., portion of workflow, etc.). In an embodiment, at 221, once the workflow or the request is authenticated the agent service may acquire some portions of the trust specification from the identity service. Those portions may include keys used to decrypt the request information. It may be that the identity service lacks the trust specification for the workflow; but, the identity service is capable of dynamically communicating with an appropriate identity service to acquire the trust specification on behalf of the agent service.

In yet another embodiment, at 222, the workflow may be acquired from the identity service. This may occur when the request included an encrypted identity and that identity was associated with the workflow. Once the agent service authenticates to the identity service and uses the source identifier, the identity service determines if the agent service can decrypt or establish trust with the source based on trust specification between the agent service and the source; assuming this is the case the agent service receives a decryption key. The decryption key is used to acquire the identity of the workflow from the request, and that identity is supplied back to the identity service where a dynamic trust relationship is established via the identity service between the agent service and the workflow. At this point, the workflow or portions of the workflow that the agent service is authorized to receive are supplied from the identity service to the agent service. Communications between the identity service and agent service may also be encrypted via trust certificates.

At 230, once the agent service has a decrypted and trusted version of the workflow or portion thereof, a next action to process within the workflow is identified in response to an active or audit log associated with the workflow. The workflow may supply a pointer to the active log. Alternatively, the identity service may provide a mechanism via the workflow trust specification for the agent service to acquire the active log or portions thereof from one or more credential stores. In an embodiment, at 231, the active log is acquired from metadata associated with the workflow, a directory, an electronic file, a data store, or various combinations of these.

The active log permits the agent service to identify what next action is to be processed for the workflow. The agent service may be associated with workflow system that is disparate from other workflow systems that previously processed the workflow. However, the active log provides a mechanism to synchronize and coordinate processing between disparate workflow systems. The active log need not be a single log; it can be assembled dynamically from a variety of sources on an as needed basis. Moreover, in some cases, the active log is acquired as a message sent to the agent service from another source.

At 240, the agent service processes the next action identified from the active log, or requests that another service process the next action. In an embodiment, at 250, the agent service and/or other service may also add status to the active log in response to processing the next action.

It is now appreciated, how a workflow may be decoupled and processed in a variety of environments in a secure and trusted manner. This permits workflow processing to be more useful to enterprises that have geographically dispersed and mobile employees who use a variety of different computing environments and services.

Figure 3:
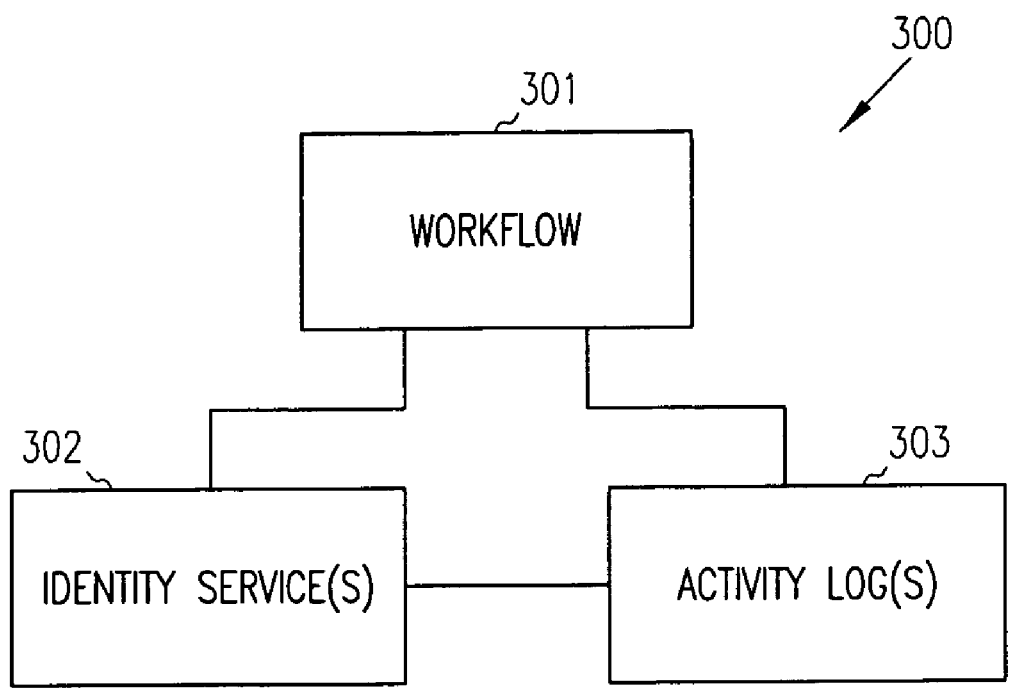
FIG. 3 is a diagram of a workflow processing system, according to an example embodiment.

FIG. 3 is a diagram of a workflow processing system 300, according to an example embodiment. The workflow processing system 300 is implemented in a machine-accessible and readable medium and is operational over a network. The network may be wired, wireless, or a combination of wired and wireless. In an embodiment, the workflow processing system 300 implements, among other things, the processing of the methods 100 and 200 presented in FIGS. 1 and 2.

The workflow processing system 300 includes a workflow 301 and one or more identity services 302. In an embodiment, the workflow processing system 300 also includes one or more activity logs 303. The workflow 301 is a data structure that includes attributes, directives, actions, identities of participants, and other information. The workflow 301 is consumed by a plurality of workflow systems, some of which are disparate from other ones of the workflow systems. No particular format of the workflow 301 is required. That is, the workflow 301 may be in a proprietary format for a particular workflow system or it may be in a generic format dictated by standards.

An agent service, similar to the processing depicted above for methods 100 and 200, is capable of parsing and interacting with the workflow 301. The workflow 301 may also be classified as a participant having its own unique identifier and trust specification.

The identity services 302 manage trust specifications for participants, such as agent services, resources, instances of the workflow 301, and the like. Example identity services 302 were provided above and incorporated by reference above. Arrangements of the workflow processing system 300 may include a single identity service 302 or a plurality of identity services 302. In arrangements where a plurality of identity services 302 are operational within the workflow processing system 300, each of the separate identity services 302 are adapted to communicate with one another for purposes of dynamically establishing and maintaining trust between participants and disparate environments that may process the workflow 301.

The workflow 301 includes some actions associated first services located and managed by a first workflow system. Additionally, the workflow 301 includes other actions associated with second services located and managed by a second workflow system. The first and second workflow systems may be disparate from one another and located in first and second environments that are external to one another.

The identity services 302 facilitates and manages the trusted and secure distribution of the workflow 301 to the first and second workflow systems and the first and second services. One technique for doing this is for the workflow 301 or portions of the workflow 301 to be distributed as trust certificates. Holders of the trust certificates interact with the identity services 302 to authenticate themselves to the workflow 301, to validate the workflow 301, and to acquire keys to decrypt the trust certificates, if the keys are not already being held.

In an embodiment, the identity services 302 may also serve to translate or facilitate the translation of statements or action within the workflow 301. For example, if the first and second workflow systems are not directly compatible with one another, then action statements in the workflow may be in an alien format to the second workflow system. The identity services 302 may supply via a trust specification for the workflow 301 a translation service that will translate the alien format to a format that the second workflow system recognizes.

In some embodiments, the workflow processing system 300 also includes one or more activity logs 303. The activity log 303 may be centralized, such as when the services and workflow systems write status and log information related to their activities with respect to the workflow 301 in a centralized location, such as metadata associated with the workflow 301, a directory, a data store, an electronic file, etc. Log information may also be captured in a distributed or decentralized fashion. In these embodiments, each environment, system, or service may write log information to their own independent locations.

In still other embodiments, the services and/or systems may be enabled to communicate status via a messaging service to one another. A master or driving workflow system (perhaps identified by the workflow trust specification) may then record individual status information being messaged back and forth among participants to a log.

Figure 4:
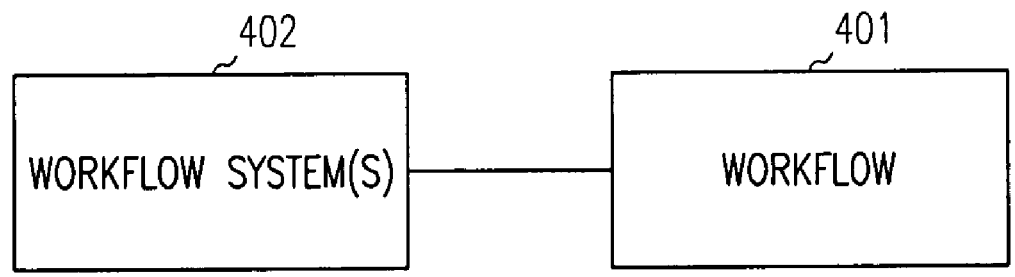
FIG. 4 is a diagram of another workflow processing system, according to an example embodiment.

FIG. 4 is a diagram of another workflow processing system 400, according to an example embodiment. The workflow processing system 400 is implemented in a machine-accessible and readable medium and is operational over a network. The network may be wired, wireless, or a combination of wired and wireless. The workflow processing system 400 presents an alternative view of the workflow processing system 300 presented above with respect to FIG. 3.

The workflow processing system 400 includes a workflow 401 and one or more workflow systems 402. The workflow 401 is similar to the workflow 301 presented above. It includes actions, directives, policies, attributes, etc. for automating a business process. It may be in a generic or a proprietary format. The workflow 401 is consumed and optionally passed around the network by agent services, such as the ones described above with respect to the methods 100 and 200 of FIGS. 1 and 2. The agent services may be integrated into the workflow systems 402 or separate and apart from the workflow systems 402 and adapted to communicate with the workflow systems 402.

During operation of the workflow processing system 400, a first workflow system 402 is processing the workflow 401 when a branch or split is detected indicating that an action of the workflow 401 is associated with an external environment and a second workflow system 400. At this point, an agent service or the first workflow system 402 packages either the identity of the workflow 401, a portion of the workflow 401, or the entire workflow 401 into one or more trust certificates.

The trust certificate is then messaged to an external or second workflow system 402 over the network. The second workflow system 402 uses the identity of the first workflow system 402 or its agent service and the trust certificate to contact its identity service. The identity service provides a mechanism for the second workflow system 402 to establish a trust with the workflow 401 and the first workflow system 402. Thus, keys are supplied or acquired (if not already held) by the second workflow system 402 and the trust certificate is decrypted. Once decrypted, the second workflow system 402 has information to acquire the workflow 401 or the appropriate portion of the workflow 401.

In some embodiments, the second workflow system 402 may access a centralized activity log to determine where processing within the workflow 401 is to resume. In other embodiments, the second workflow system 402 may query the identity service or the first workflow system 402 to determine where processing is to resume. Once a next action is determined from the workflow 401, the second workflow system 402 processes that action or packages the request to process the action in yet another trust certificate and sends it to a service that can process it. The whole interaction may be repeated by the receiving and processing services. Moreover, the actions of the second workflow system 402 and the processing service may be captured in the activity log or messaged to other participants.

It is now appreciated how workflow activities may span multiple disparate environments and systems. The activities may be reliably tracked, processed, and monitored in a secure and trusted manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method executed by a computer to perform the method, comprising:
    identifying, by the computer, an action within a workflow, the workflow is processing within a first environment;
    requesting, by the computer, an identity service identify a service to handle the action and to associate with the action, a format of the action identified is unknown to the method and the identity service identifies the service that can handle the action, and the workflow is a data structure produced by a workflow system, the workflow includes specifications, directives, and references to particular services for performing particular actions;
    associating, by the computer, the workflow with a trust specification that is managed by the identity service and defines relationships for participants of the workflow in relation to one another and defines authentication mechanisms for use between the participants, the workflow also includes an identification for a translations service that can translate alien formats to formats that the workflow system or another workflow system recognizes, the trust specification hierarchical;
    communicating, by the computer, the action and the workflow to the service; and
    authenticating, by the computer, the action and the workflow via an identity service, authentication achieved by the identity service inspecting whether processing the action or the workflow is permissible according to the trust specification and if authenticated processing the action by the service.

2. The method of claim 1, wherein communicating further includes contacting the identity service to acquire an identity of the service.

3. The method of claim 2 further comprising, notifying, by the identity service, a workflow system processing within a second environment of at least one of the action and the workflow.

4. The method of claim 1, wherein communicating further includes encrypting at least one of the action and the workflow within one or more trust certificates and sending the encrypted one or more trust certificates to a work flow system processing within a second environment.

5. The method of claim 1 further comprising, transmitting, by the computer, a status from a second environment to the first environment in response to the service processing the action.

6. The method of claim 1 further comprising, recording, by the computer, a status associated with the service processing the action within metadata associated with the workflow.

7. The method of claim 6 further comprising, signing, by the service, the status within the metadata.

8. A computer-implemented method executed by a computer to perform the method, comprising:
    receiving, by the computer, a request to process a workflow, the workflow is a data structure produced by a workflow system, the workflow includes specifications, directives, and references to particular services for performing particular actions;
    associating, by the computer, the workflow with a trust specification that is managed by an identity service and defines relationships for participants of the workflow in relation to one another and defines authentication mechanisms for use between the participants, the workflow also includes an identification for a translations service that can translate alien formats to formats that the workflow system or another workflow system recognizes the trust specification hierarchical, the trust specification identifies rights, privileges and the participants who can interact and consume directives of the workflow;
    interacting, by the computer, with the identity service to authenticate the workflow authentication achieved by the identity service inspecting whether processing the workflow is permissible according to the trust specification; and
    identifying, by the computer, the next action to process within the workflow in response to an active log associated with the workflow.

9. The method of claim 8 further comprising, acquiring, by the computer, the trust specification from the identity service for the workflow, wherein the trust specification includes at least one of security rights associated with the workflow, an identity of a service to process the next action, and an identifier for the active log.

10. The method of claim 8 further comprising, retrieving, by the computer, the work flow from the identity service in response to the request which includes a workflow identity.

11. The method of claim 8 further comprising, acquiring, by the computer, the active log from at least one of metadata associated with the workflow, a directory, an electronic file, and a data store.

12. The method of claim 8, wherein receiving the request further includes receiving the request from at least one of a workflow system associated with an external environment and the identity service.

13. The method of claim 8 further comprising, adding, by the computer, status information to the active log in response to processing performed by a service on the next action.

* * * * *